3,077,767
PNEUMATIC SYSTEMS FOR GAUGING
LINEAR DIMENSIONS
Louis Ollivier, Hatboro, and Nathaniel Brewer, Newtown,
Pa., assignors to Fischer & Porter Company, Hatboro,
Pa., a corporation of Pennsylvania
Filed Oct. 22, 1957, Ser. No. 691,643
15 Claims. (Cl. 73—37.5)

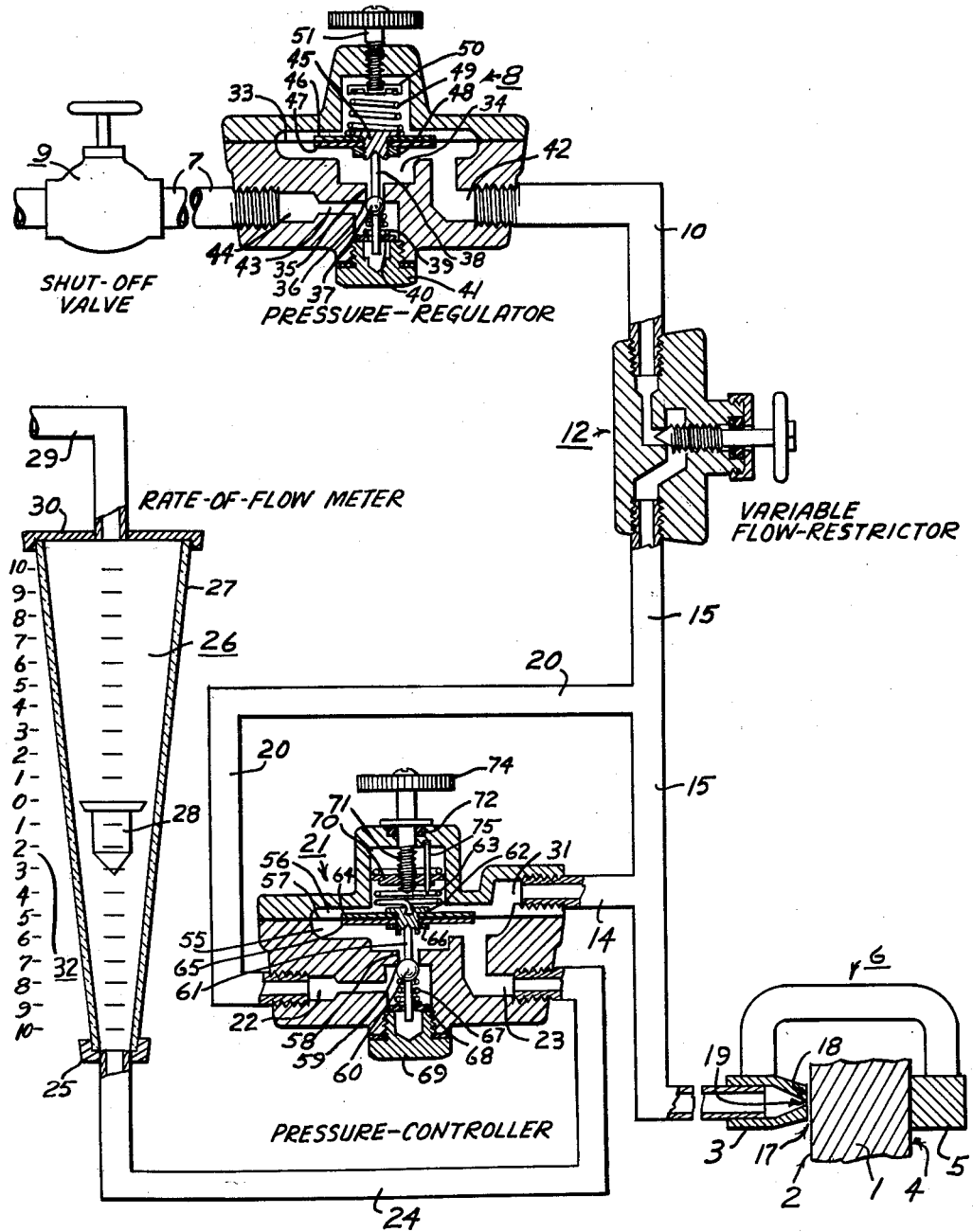

The present invention relates to a pneumatic system for accurately measuring or gauging small differences in the external or internal linear dimensions of work-pieces or mechanical elements, for inspection and quality-control either in the course of their manufacture or thereafter, or for controlling automatic production or processing equipment by the dimension of the work-piece.

Pneumatic systems for so measuring or gauging linear dimensions have been used before. In such practice the measurement-sensing element, work-gauge or "head" includes an air-escape nozzle or air-escape orifice which is applied to the work-piece or mechanical element to be measured, as, for instance, by making the air-escape nozzle one side or one "jaw" of a C type gauge (similar to a C type micrometer) with the distance between the other jaw or "anvil" of the C gauge and the air-escape nozzle or sensing element fixed at slightly greater (by perhaps a thousandth of an inch, more or less) than the desired dimension or specified dimension of the work-piece to be gauged. For gauging internal dimensions the air-escape nozzle may be in a "plug" inserted into the bore to be gauged. Air is passed through the air-escape nozzle of the "head" while the work-piece is between it and the anvil, and the deviation of the work-dimension from the gauge-dimension is indicated by the extent of air-escape between the work-piece and the nozzle; such air-escape being indicated either by pressure-drop or by rate-of-flow.

The air-escape nozzle or sensing element may be either of the direct type which discharges the air directly against the work-surface being measured and wherein the clearance between the nozzle and the work-surface constitutes the final air-escape orifice whose effective area or size varies with the variations in such clearance, or the air-escape nozzle may be of the plunger type or internal escape-valve type in which the sensing device or "head" includes a movable plunger or like work-contacting feeler constituting a part thereof (and which is carried by a stationary portion of the sensing "head"), and in which the movement of the plunger or feeler similarly regulates the size or area of a small valve-like air-escape orifice within the sensing "head," in accordance with deviation of the work-dimension from gauge-dimension, so that the air-escape is not directly against the work-surface but is through an air-escape valve in the sensing head controlled by the movement of the work-contacting plunger or mechanical "feeler" element which bears against the work-surface to be gauged.

The object of the present invention is a pneumatic system for measuring the air-escape (between the work-surface and the measurement-sensing nozzle or through the air-escape valve of a plunger type measurement-sensing "gauge-head" applied to the work-piece), which will provide an adequate range of adjustment of magnification, gain or sensitivity, and which will provide an effective and convenient zero-setting, and which will have adequate speed of response and stability and which will be reliable under operating conditions.

The accompanying drawing, in which like reference characters indicate like parts, is a diagrammatic or schematic view of a pneumatic system for air-gauging linear dimensions, representing one embodiment of the present invention. This drawing is for the purpose of illustrating the invention, and it is to be understood that the various instrumentalities of which the invention consists can be variously arranged and organized and that the invention is not limited to the precise arrangement and organization of the instrumentalities as therein shown and hereinafter described.

In the accompanying drawing, the work-piece is designated generally by the numeral 1, and the work-surface to which the air-escape nozzle, sensing-head or work-feeler is applied is designated by the numeral 2, and the sensing nozzle is designated by the numeral 3. It is to be understood that the work-piece 1 may be of any character or shape, and that the surface 2 thereof may be either an external or an internal surface and may be either flat, cylindrical or any other shape. In the illustration shown in the drawing the work-piece is represented as having external surfaces 2 and 4, whose linear distance, one from the other, is to be gauged. The surface 4 of the work-piece bears against or is supported by an anvil or like stationary element 5 juxtaposed to the sensing nozzle 3; the anvil 5 and the nozzle 3 being stationary in relation to each other so that the distance between them is the gauging distance or the gauging dimension, and together they form the gauging "head" in the C type gauge 6 shown for purposes of illustration.

In the embodiment of the invention shown, compressed air (or other compressed gas) at a pressure suitably higher than the system pressure, is supplied through the supply-line 7 to an adjustable pressure-regulator 8, through a shut-off valve 9; the pressure regulator being adjusted to deliver air to the system at a selected constant pressure, which may be, for example, 15 to 20 p.s.i.g. The air from the pressure-regulator 8 (at the selected constant pressure) passes through the conduit 10 to a manually-adjustable flow-restrictor, which may be a variable orifice, such as, for example, the needle-valve 12. From the flow-restrictor 12 the air branches, namely, to the point-of-measurement line or conduit 15 and to the bleed-off or indicator line or conduit (20 and 24), respectively.

At the end of the point-of-measurement line 15 is the measurement-sensing nozzle 3 or the measurement-sensing air-escape orifice. In the illustration shown, the measurement-sensing air-escape at the work-measurement-point is the orifice 17 formed by the clearance between the work-surface 2 and the end 18 of the nozzle 3 through which the nozzle-opening 19 extends.

The bleed-off or indicator line 20 goes to the inlet 22 of an adjustable pressure-controller 21, while the outlet 23 of said pressure-controller is connected through the bleed-off or indicator line or conduit 24 with the lower end-fitting 25 of the rate-of-flow meter designated generally by the numeral 26. In the embodiment shown, the rate-of-flow meter is of the variable-area type including a suitably calibrated tapered metering-tube 27 and a metering-head or metering-float 28 therein; the position of the metering-float in the tapered tube indicating the rate-of-flow of the measurement-indicating bleed-off air passing upwardly through the tapered tube. The top of the metering tube 27 is vented to the atmosphere through any suitable outlet or vent opening 29 in the upper tube-fitting 30 of the rate-of-flow meter 26. By the pneumatic system of the present invention no part of the measurement-indicating bleed-off air passes through the downstream end of the point-of-measurement line or through the measurement-sensing device connected therewith.

A pilot line or conduit 14 extends from point-of-measurement line 15 (or from the indicator line 20 in free communication therewith) to the control inlet 31 of the pressure-controller 21.

The pressure regulator 8 may be of any suitable construction, as, for instance, that shown in the drawing, wherein a diaphragm 33 constitutes a flexible and movable wall of the pneumatic chamber 34, the inlet 35 of which is through the valve-seat 36 against which the movable valve 37, carried by the valve-stem 38, is adapted to seat. The valve 37 is urged in its seating direction by the valve-closing spring 39 whose stationary end is supported by a spring-seat 40 in or on the closure plug 41 which is threaded into the body of the regulator 8 and sealed thereto by a suitable gasket or the like. The pneumatic chamber 34 has an outlet 42 to which the line or conduit 10 is connected, while the inlet chamber 43 has an inlet 44 to which the supply line or conduit 7 is connected. The upper end of the valve-stem 38 nests in the stem receiving cavity or socket in the diaphragm-assembly plug 45 which extends through the discs 46 and 47 which flank the diaphragm 33 and which are secured by the nut 48. The lower end of the valve-stem 38 may extend through a guide-hole in the spring-seat 40, which may be a washer. The helical compression spring 49 is interposed between a spring-anchorage 50 carried by the adjustment screw 51 and the disc 46 or the top of the assembly plug 45, so as to urge the diaphragm 33 and hence the plug 45 and the valve-stem 38 towards the pneumatic chamber 34, thereby to tend to unseat the valve 37 and to permit the flow of air from the supply-line 7 to the outlet 42 and hence through the line 10 to the flow-restrictor 12, and through the latter to the point-of-measurement line 15 and the indicator line (20 and 24). As the pressure in the line 10 decreases, the pressure in the pneumatic chamber 34 correspondingly decreases and the spring 49 over-balances the so reduced air-pressure within the chamber 34 and moves the diaphragm 33 and the valve-stem 38 to unseat the valve 37 so as to admit air at the higher supply-pressure into the chamber 34 and hence into the line 10, until the pressure in line 10 and hence in the chamber 34 is of such magnitude that when applied to the diaphragm 33 (and augmented by the force of the spring 39) it will balance the force of the spring 49, so as to seat or tend to seat the valve 37 against its seat 36. In this manner, a predetermined pressure is maintained generally constant in the line 10, as, for instance, a pressure of 15 or 20 pounds (the supply-pressure admitted through the shut-off valve 9 and the supply-conduit 7 being substantially greater than the pressure desired in the line 10).

The variable orifice or flow-restrictor 12 may be of any conventional construction or arrangement, as, for instance, the needle-valve 12 shown in the drawing. However the variable flow-restrictor, such as a needle-valve, may be included in the main body of the pressure-regulator 8, as, for instance, in the passageway between the chamber 34 and the outlet 42 thereof.

The pressure-controller 21 includes opposed pneumatic chambers 55 and 56 separated by the diaphragm 57, with the outlet 23 communicating with the chamber 55 and with the pilot-inlet 31 communicating with the chamber 56. A valved passageway 58 is provided in the wall between the pneumatic chamber 55 and the inlet 22, and the outer-periphery 59 of said passageway 58 may serve as a valve-seat for the valve 60 carried by the valve-stem 61. The inner end of the valve-stem 61 nests in the stem-receiving recess or socket in the diaphragm-assembly plug or member 62 which also serves as a spring-anchorage for the helical tension spring 63, and which extends through the discs 64 and 65 which flank the diaphragm 57 and which are held in assembled relation by the nut 66 threaded onto the projecting end of the plug 62. The outer end of the valve-stem 61 may be guided in a guide-hole in the spring-seat 68. A valve-seating spring 67 is interposed between the valve 60 and the spring-seat 68 on or in the plug 69 which is screw-threaded into the body of the pressure-controller and is sealed thereto by any suitable gasket or the like, in the manner indicated in the drawing. The inner end of the helical tension spring 63 is secured to the assembly member 62 in any suitable manner, and the outer end thereof is secured to the non-revoluble spring-anchorage 70 through which the adjustment-screw 71 is screw-threaded for varying the pull of the spring 63 upon the diaphragm-assembly member 62 according to the position to which the spring-anchorage 70 is moved by the screw 71; spring-anchorage 70 being keyed to the housing by any suitable keying means, as, for instance the stationary pin 75 carried by the housing and slidably extending through a hole in the spring-anchorage. The stem of the screw 71 extends through the upper housing member of the pressure-controller and is provided with any suitable seal 72, to seal it in relation to the housing while permitting it to be rotated. A thrust flange is suitable affixed to the stem of the screw 71 and bears against the outside of the housing, so as to permit the screw 71 to pull the spring-anchorage 70 against the force of the spring 63. Any suitable handle 74 affixed to the stem of the screw 71 serves to permit the convenient turning of the screw to adjust the force of the spring 63.

The pressure on the downstream side of the flow-restrictor 12 is less than the pressure on the upstream side thereof, according to the adjustment of the flow-restrictor and the adjustment of the flow-controller 21. Thus, for example, the pressure on the downstream side of the flow-restrictor 12 (and hence in the point-of-measurement line 15 and in the indicator line 20) may be set at 5 to 10 p.s.i.g.

As the pressure in the point-of-measurement line increases (or tends to increase) by the reduction of the clearance 17 (or by the decrease in the difference between work-dimension and gauge-dimension), the pressure in the chamber 56 increases (or tends to increase) correspondingly, and such increased pressure, acting upon the diaphragm 57, over-balances the pull of the spring 63 and the force of the compression spring 67, and so unseats the valve 60 from its seat 59 and thus permits the flow of air from the point-of-measurement line 15 (through the indicator line 20) into the pneumatic chamber 55, and thereby bleeds the air from the point-of-measurement line 15 through the rate-of-flow meter 26, and so maintains the pressure and the flow-rate in the point-of-measurement line 15 substantially constant; such pressure being somewhat less than the pressure at the upstream side of the flow-restrictor 12 (or in the conduit 10) by an amount determined by the seating of the needle-valve or variable orifice 12 and by the adjustment of the pressure-controller 21.

Conversely, as the pressure in the point-of-measurement line 15 decreases (or tends to decrease) by an increase of the clearance 17 (or by the increase of the difference between work-dimension and gauge-dimension), the pressure in the pilot chamber 56 also decreases (or tends to decrease) correspondingly, and such decrease in pressure permits the spring 63 (augmented by the spring 67) to seat (or tend to seat) the valve 60 and thus reduces the bleed-off through the indicator line (20 and 24) and so again restores the pressure in the point-of-measurement line 15 (and in the indicator line 20) to its original setting.

In the system of the present invention there is a continuous flow of air, and at a generally constant rate, through the flow-restrictor or orifice 12, which is the sum of the flow through the clearance 17 and the flow through the rate-of-flow meter 26, and the respective rates of flow through the point-of-measurement orifice or clearance 17 and through the meter 26 are complementary of each other. Thus, as the flow through the clearance 17 increases, the flow through the rate-of-flow meter 26 decreases, and vice versa. The gain or sensitivity of the system is adjustable by varying the pressure in the point-of-measurement line 15 by the adjustment of the pressure controller 21, while the zero-setting is obtainable by adjusting the variable flow-restrictor 12.

By the system of the present invention a gain, magnification or sensitivity of as much as 2 to 1 may be obtained.

Having described our invention, we claim:

1. A pneumatic system for measuring linear dimensions and for use with air-escape type pneumatic measurement-sensing devices adapted for operative juxtaposition to the work-piece whose measurement is to be gauged, said pneumatic system including a point-of-measurement line whose discharge-end is adapted for connection with such measurement-sensing device and whose inlet-end is adapted to be supplied with compressed air at a selected constant pressure, a bleed-off line connected with said point-of-measurement line intermediate its discharge-end and its inlet-end, a bleed-off-measuring rate-of-flow meter having its inlet-end connected with the outlet-end of said bleed-off line and having its outlet-end freely vented directly to the atmosphere and directly responsive only to the rate of flow through said bleed-off line.

2. A pneumatic circuit for measuring linear dimensions and for use with air-escape type pneumatic measurement-sensing devices adapted for operative juxtaposition to the work-piece whose measurement is to be gauged, said pneumatic circuit including a point-of-measurement line whose discharge-end is adapted for connection with such measurement sensing device and whose inlet-end is adapted to be supplied with compressed air at a selected constant pressure, a bleed-off line extending from said point-of-measurement line and arranged to have its inlet-end supplied with the same constant air pressure, said bleed-off line including a rate-of-flow indicator which reflects the rate of flow through the aforementioned discharge-end of said point-of-measurement line said rate-of-flow indicator being arranged to be directly responsive only to the rate of flow through said bleed-off line.

3. A pneumatic circuit for measuring linear dimensions and for use with air-escape type pneumatic measurement-sensing devices adapted for operative juxtaposition to the work-piece whose measurement is to be gauged, said pneumatic circuit including a point-of-measurement line whose discharge-end is adapted for connection with such measurement sensing device and whose inlet-end is adapted to be supplied with compressed air at a selected constant pressure, a bleed-off line extending from said point-of-measurement line and adapted to have its inlet-end supplied with the same constant air pressure, said bleed-off line including a rate-of-flow indicator which reflects the rate of flow through the aforementioned discharge-end of said point-of-measurement line, and a flow-controller in said bleed-off line on the up-stream side of said rate-of-flow indicator arranged to the rate of flow through said bleed-off line in relation to the rate of flow through said point-of-measurement line, said flow-controller being operatively interposed between said point-of-measurement line and said bleed-off line.

4. A pneumatic system for measuring linear dimensions and for use with air-escape type pneumatic measurement-sensing devices adapted for operative juxtaposition to the work-piece whose measurement is to be gauged, said pneumatic system including a point-of-measurement line and a bleed-off line having their up-stream ends connected with a source of compressed air at a selected constant pressure, the down-stream end of said point-of-measurement line being adapted for connection with such measurement-sensing device, and a rate-of-flow indicator having its inlet connected with the down-stream end of said bleed-off line and having its outlet-end uniformly vented to the atmosphere with variations in the linear dimensions being measured, said rate-of-flow indicator being arranged to be directly responsive only to the rate of flow through said bleed-off line.

5. A pneumatic system for measuring linear dimensions and for use with air-escape type pneumatic measurement-sensing devices adapted for operative juxtaposition to the work-piece whose measurement is to be gauged, said pneumatic system including a point-of-measurement line and a bleed-off line, having their up-stream ends connected with a source of compressed air at a selected constant pressure, the down-stream end of said point-of-measurement line being adapted for connection with such measurement-sensing device, and a rate-of-flow indicator having its inlet connected with the down-stream end of said bleed-off line and having its outlet freely vented directly to the atmosphere, and directly responsive only to the rate of flow through said bleed-off line no part of the air discharged from the discharge outlet of said rate-of-flow indicator passing through the downstream end of said point-of-measurement line or through the measurement-sensing device connecting therewith.

6. A pneumatic system for measuring linear dimensions and for use with air-escape type pneumatic measurement-sensing devices adapted for operative juxtaposition to the work-piece whose measurement is to be gauged, said pneumatic system including a point-of-measurement line and a bleed-off line each having its up-stream end connected with a source of compressed air at a selected constant pressure, the down-stream end of said point-of-measurement line being adapted for connection with such measurement-sensing device, and a rate-of-flow indicator having its inlet connected with the down-stream end of said bleed-off line, and being directly responsive only to the rate of flow through said bleed-off line and a flow-controller in said bleed-off line on the upstream side of said rate-of-flow indicator, arranged to vary the rate of flow therethrough in relation to the rate-of-flow through said measurement-sensing device, said flow-controller being operatively interposed between said point-of-measurement line and said bleedoff line.

7. A pneumatic system for measuring linear dimensions and for use with air-escape type pneumatic measurement-sensing devices adapted for operative juxtaposition to the work-piece whose measurement is to be gauged, said pneumatic system including a point-of-measurement line and a bleed-off line having their up-stream ends connected with a source of compressed air at a selected constant pressure, the down-stream end of said point-of-measurement line being adapted for connection with such measurement-sensing device, and a rate-of-flow indicator having its inlet connected with the down-stream end of said bleed-off line, and a flow-controller in said bleed-off line responsive to change in the rate of flow through said point-of-measurement line for varying the rate of flow through said bleed-off line in inverse relation to the rate of flow through the downstream end of said point-of-measurement line, said flow-controller being operatively interposed between said point-of-measurement line and said bleed-off line, and said rate-of-flow indicator being directly responsive only to the rate of flow through said bleed-off line.

8. A pneumatic system for measuring linear dimensions and for use with air-escape type pneumatic measurement-sensing devices adapted for operative juxtaposition to the work-piece whose measurement is to be gauged, said pneumatic system including a point-of-measurement line and a bleed-off line having their up-stream ends connected with a source of compressed air at a selected constant pressure, the down-stream end of said point-of-measurement line being adapted for connection with such measurement-sensing device, and a rate-of-flow indicator having its inlet connected with the down-stream end of said bleed-off line, and a flow-controller in said bleed-off line on the upstream side of said rate-of-flow indicator arranged to vary the rate of flow therethrough and having communication with said point-of-measurement line and arranged variably to divert air from said point-of-measurement line through said bleed-off line and to maintain the pressure in said point-of-measurement line substantially constant notwithstanding variations in rate of flow from said point-of-measurement line to such measurement-sensing device, said flow-controller being operatively interposed between said point-of-measurement line and said bleed-off line and said rate-of-flow indicator being directly responsive only to the rate of flow through said bleed-off line.

9. A pneumatic system for measuring linear dimensions and for use with air-escape type pneumatic measurement-sensing devices adapted for operative juxtaposition to the work-piece whose measurement is to be gauged, said pneumatic system including a point-of-measurement line whose discharge-end is adapted for connection with such measurement-sensing device and whose inlet-end is adapted to be supplied with compressed air at a selected constant pressure, a variable orifice in the aforesaid point-of-measurement line capable of being set to any desired setting within its operative range and to be maintained at such setting, a bleed-off line connected with the aforesaid point-of-measurement line at a point intermediate its discharge-end and the aforesaid variable orifice, a rate-of-flow meter having its inlet-end connected with said bleed-off line and having its outlet-end vented to the atmosphere, said rate-of-flow meter being directly responsive only to the rate of flow through said bleed-off line.

10. A pneumatic system for measuring linear dimensions, including, in series, a source of pneumatic pressure, a pressure-regulator, a flow-restrictor, a point-of-measurement line and a measurement-sensing orifice at the end of said point-of-measurement line, a bleed-off line connected with the aforementioned series-connected elements intermediate said pressure-regulator and said measurement-sensing orifice, a pressure controller in said bleed-off line, said pressure controller having a pilot chamber connected with said point-of-measurement line intermediate said flow-restrictor and said measurement-sensing orifice, and a rate-of-flow meter at the end of said bleed-off line.

11. A pneumatic system for measuring linear dimensions, including, in series, a source of pneumatic pressure, a pressure-regulator, a flow-restrictor, a point-of-measurement line and a measurement-sensing orifice at the end of said point-of-measurement line; a bleed-off line extending from said point-of-measurement line and terminating in a rate-of-flow meter, and a flow-controller in said bleed-off line arranged to maintain the pressure in said point-of-measurement line substantially constant by varying the flow through said bleed-off line, said flow-controller being operatively interposed between said point-of-measurement line and said bleed-off line and said rate-of-flow indicator being directly responsive only to the rate of flow through said bleed-off line.

12. A pneumatic system for measuring linear dimensions, including, in series, a source of pneumatic pressure, a pressure-regulator, a flow-restrictor, a point-of-measurement line and a measurement-sensing orifice at the end of said point-of-measurement line; a bleed-off line extending from said point-of-measurement line and terminating in a rate-of-flow meter, and a flow-controller in said bleed-off line having a pilot side connected with said point-of-measurement line and arranged to maintain substantially constant the pressure in said point-of-measurement line and the rate of flow through said flow-restrictor by varying the flow through said bleed-off line.

13. A pneumatic system for measuring linear dimensions, said system including a supply line adapted for connection with a source of compressed air, a pressure-regulator in said supply line, a variable flow-restrictor in said supply line on the down-stream side of said pressure-regulator, a point-of-measurement line extended from the down-stream side of said variable flow-restrictor, a measurement-sensing orifice constituting the discharge end of said point-of-measurement line, said measurement-sensing orifice being adapted to be operatively juxtaposed to the work-piece whose dimension is to be gauged and the resistance to flow of said measurement-sensing orifice being variable by the variation of the dimension of the work-piece from the gauge-dimension, and an indicator-line extending from said point-of-measurement line intermediate said variable flow-restrictor and said variable measurement-sensing orifice, a pressure-controller in said indicator line, and a rate-of-flow meter at the discharge end of said indicator line, said pressure-controller having a pilot line connected with said point-of-measurement line intermediate said variable flow-restrictor and said variable measurement-sensing orifice, said pressure-controller having a valve therein regulating the flow through said indicator line and a biasing spring connected with said valve, the pressure in said pilot line tending to open said valve and said biasing spring tending to close said valve, whereby the rate of flow through said flow-restrictor will be maintained substantially constant and whereby the pressure at the down-stream side of said flow-restrictor will be kept substantially constant notwithstanding variations in the resistance to flow of said measurement-sensing orifice; the flow through said flow-restrictor being divided between the point-of-measurement line and the indicator line and the flow through each being complementary of the other.

14. A pneumatic system for measuring linear dimensions and for use with air-escape type pneumatic measurement-sensing devices adapted for operative juxtaposition to the work-piece whose measurement is to be gauged, said pneumatic system including a point-of-measurement line whose discharge-end is adapted for connection with such measurement-sensing device and whose inlet-end is adapted to be supplied with compressed air at a selected constant pressure, a bleed-off line connected with said point-of-measurement line intermediate its discharge-end and its inlet-end, a bleed-off-measuring rate-of-flow meter having its inlet-end connected with the outlet-end of said bleed-off line and having its outlet-end vented to the atmosphere, and bleed-off control means operatively interposed between said point-of-measurement line and the upstream-end and the outlet-end of said bleed-off line for varying the rate of bleed-off in relation to the rate of the air escaping through the pneumatic measurement-sensing device operatively juxtaposed thereto and connected with the point-of-measurement line.

15. A pneumatic circuit for measuring linear dimensions and for use with air-escape type pneumatic measurement-sensing devices adapted for operative juxtaposition to the work-piece whose measurement is to be gauged, said pneumatic circuit including a point-of-measurement line whose discharge-end is adapted for connection with such measurement-sensing device and whose inlet-end is adapted to be supplied with compressed air at a selected constant pressure, a bleed-off-line extending from said point-of-measurement line and arranged to have its inlet-end supplied with the same constant air pressure, said bleed-off-line including a rate-of-flow indicator which reflects the rate of flow through the aforementioned discharge-end of said point-of-measurement line, and a flow-controller operatively interposed between said point-of-measurement line and said bleed-off line arranged to vary the rate of flow through said rate-of-flow indicator in inverse relationship to the rate of flow through the discharge-end of said point-of-measurement line.

References Cited in the file of this patent

UNITED STATES PATENTS

| | | |
|---|---|---|
| 2,359,236 | Moore | Sept. 26, 1944 |
| 2,501,965 | Rupley | Mar. 28, 1950 |
| 2,706,397 | Byrkett | Apr. 19, 1955 |
| 2,805,568 | Baker | Sept. 10, 1957 |
| 2,831,257 | Aller | Apr. 22, 1958 |
| 2,889,704 | Baker (II) | June 9, 1959 |

FOREIGN PATENTS

| | | |
|---|---|---|
| 601,523 | Great Britain | May 7, 1948 |
| 829,505 | Germany | Jan. 28, 1952 |